US008095235B2

(12) United States Patent
Tzeng et al.

(10) Patent No.: US 8,095,235 B2
(45) Date of Patent: Jan. 10, 2012

(54) METHOD FOR CONTROL OF HUMIDITY AND AUTO-DISPENSING OF PILLS IN A PILL BOX

(75) Inventors: Hsinn-Jyh Tzeng, Taipei (TW); Ting-Wei Yang, Tainan County (TW); Tsan-Cheng Yang, Tainan County (TW); Chih-Chun Chang, Tainan County (TW); Meng-Feng Tsai, Tainan County (TW); Chih-Tung Su, Tainan County (TW)

(73) Assignee: Southern Taiwan University, Yung Kang, Tainan County (TW)

( * ) Notice: Subject to any disclaimer, the term of this patent is extended or adjusted under 35 U.S.C. 154(b) by 37 days.

(21) Appl. No.: 12/646,439

(22) Filed: Dec. 23, 2009

(65) Prior Publication Data

US 2011/0153068 A1 Jun. 23, 2011

(51) Int. Cl.
*G06F 17/00* (2006.01)

(52) U.S. Cl. ........ 700/232; 700/237; 700/242; 700/243; 221/150 R

(58) Field of Classification Search .................. 700/231, 700/232, 237, 240–243; 221/150 R, 150 HC, 221/150 A See application file for complete search history.

(56) References Cited

U.S. PATENT DOCUMENTS

| | | | | |
|---|---|---|---|---|
| 3,638,830 | A * | 2/1972 | Belokin, Jr. | 221/246 |
| 4,697,721 | A * | 10/1987 | Johnson et al. | 221/211 |
| 6,263,259 | B1 * | 7/2001 | Bartur | 700/240 |
| 6,471,087 | B1 * | 10/2002 | Shusterman | 221/2 |
| 7,680,001 | B1 * | 3/2010 | D'Annunzio et al. | 368/10 |
| 7,780,008 | B2 * | 8/2010 | Portier | 206/540 |
| 2003/0216831 | A1 * | 11/2003 | Hart et al. | 700/235 |
| 2006/0213917 | A1 * | 9/2006 | Handfield et al. | 221/13 |
| 2007/0163917 | A1 * | 7/2007 | Friesen et al. | 206/528 |
| 2008/0054007 | A1 * | 3/2008 | Mador | 221/1 |
| 2010/0219198 | A1 * | 9/2010 | Goldman | 221/25 |
| 2011/0060457 | A1 * | 3/2011 | De Vrught et al. | 700/241 |

* cited by examiner

*Primary Examiner* — Michael K Collins

(74) *Attorney, Agent, or Firm* — Muncy, Geissler, Olds & Lowe, PLLC

(57) ABSTRACT

A method for control of humidity and auto-dispensing of pills in a pill box includes a box having multiple rooms defined therein which are shifted to be in alignment with an outlet. The method controls the humidity in each of the rooms and provides a control unit which controls a transmission unit to proceed a mechanical action to shift the rooms to be in alignment with the outlet according to a time setting signal so as to dispense at least one pill. The method includes a display unit to display time information and provides a reminder to take pills by way of audio and/or light.

5 Claims, 6 Drawing Sheets

METHOD FOR CONTROL OF HUMIDITY AND AUTO-DISPENSING OF PILLS IN A PILL BOX

FIELD OF THE INVENTION

The present invention relates to a method for control of humidity and auto-dispensing of pills in a pill box, and more particularly, to a method for automatically dispensing pills and keeping desired humidity in the rooms for storage of the pills.

BACKGROUND OF THE INVENTION

Along with longer life term to the people in the modern world, the populations of elders having chronic diseases increase rapidly and most of the elders have more than one chronic disease. The elders having chronic diseases have to take different types of pills everyday.

According to the statistics, more than two thirds of elder people over age of 65 take one or more than one pill everyday and a quarter of these elder people even take three pills everyday. The elder people often forget when to take the pills so that they sometimes take double the dosages or sometimes forget to take the pills at all. Therefore, a pill box or pill reminder is developed to assist the elder people to take pills according to the directions of doctors.

Referring to FIG. 6, a conventional pill box includes a base "A" and a timer "B" which displays indication lights and provides an audio function to remind the users to take pills. However, some of the users have difficulties to take the pills from the pill box because of physical problems and the pills may drop out from the pill box. Besides, the conventional pill box lacks of function of dehumidification and the pills in the pill box might be affected by high humidity.

SUMMARY OF THE INVENTION

The present invention intends to provide a method to conveniently have the pills and control the humidity in the rooms for storage of the pills of a pill box.

The present invention relates to a method for control of humidity and auto-dispensing of pills in a pill box, and the method comprises a box having multiple rooms defined therein which are shifted to be in alignment with an outlet to dispense at least one pill from the room to the outlet.

The method controls the humidity in each the room such that the humidity of each room is lower than ambient humidity, and provides a control unit which transmits a time setting signal, and controls a transmission unit to proceed a mechanical action to shift the rooms to be in alignment with the outlet according to the time setting signal and the at least one pill being dispensed.

The method provides a display unit to display time information, reminding message to take pills, and the humidity of the rooms. The information of the pills includes names of the pills, the amount that the pills to be taken, the way that the pills to be taken, the shapes of the pills and the colors of the pills.

When any one of the rooms is in alignment with the outlet, the display unit displays information of the pills and reminds by way of audio and/or light. The audio and/or light are generated by light emitting diodes and sound generation elements.

The method further comprises a dehumidifying agent to control the humidity in each room, and the dehumidifying agent is $SiO_2$ which is functioned in each room.

The information of the pills includes names of the pills, the amount that the pills to be taken, the way that the pills to be taken, the shapes of the pills and the colors of the pills.

The audio and/or light are generated by light emitting diodes and sound generation elements.

The present invention has the following advantages:

1. The pills are supplied at a desired time and the user is reminded by the method. The pills are sorted and put in the rooms and are dispensed at the desired time controlled by the time setting information. The dispensing of the pills is alarmed by way of audio and/or light. The display unit displays the pill taking information to assist the user to take the pills correctly.

2. The pills are not affected by humidity. The pills are received in the rooms where the humidity is controlled by the dehumidifying agent which is $SiO_2$. The dehumidifying agent is non-toxic, odorless, non-vaporized and can be reused, so that the pills can be kept in a dry space and are not affected y the humidity. Furthermore, the dehumidifying unit comprises an initialization unit to initialize the dehumidifying agent.

3. The time for taking pills can be freely set by the user. The present invention allows the user to set the time for taking the pills according to the types of pills and the instructions of the doctors, such as taking the pills once a day, three times a day or four times a day. The function allows the users to take multiple pills in one time. The present invention provides a method to manage the pills so that the user especially for a person who has a chronic disease can take pills exactly according to the instructions of the doctor and reduces waste of the pills because of forgotten to take pills.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

The present invention relates to a method for control of humidity and auto-dispensing of pills in a pill box, and comprises:

providing a box having multiple rooms defined therein which are shifted to be in alignment with an outlet to dispense pills from one of the rooms to the outlet;

controlling humidity in each of the rooms such that the humidity of each of the rooms is lower than ambient humidity;

providing a control unit which transmits a time setting signal and controlling a transmission unit to proceed a mechanical action to shift one of the rooms to be in alignment with the outlet according to the time setting signal and the pills being dispensed;

providing a display unit to display time information, reminding message to take pills, and the humidity of the rooms, wherein the information to take the pills includes names of the pills, the amount that the pills to be taken, the way that the pills to be taken, the shapes of the pills and the colors of the pills; and when any one of the rooms is in alignment with the outlet, the display unit displays information of the pills and providing a reminder by way of audio and/or light, wherein the audio and/or light are generated by light emitting diodes and sound generation elements.

Figure 1:
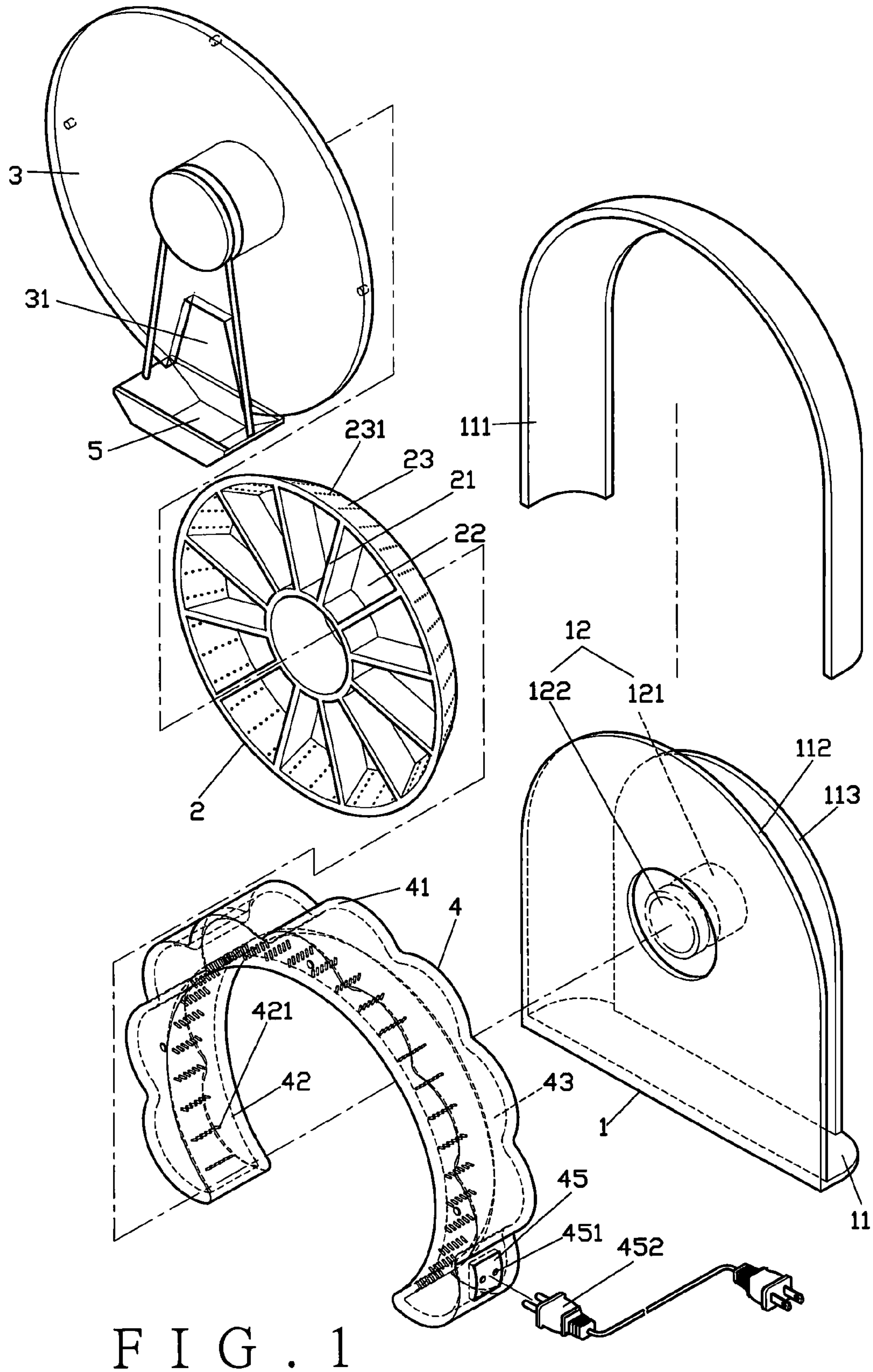
FIG. 1 is an exploded view of a preferred embodiment of the present invention.
Figure 2:
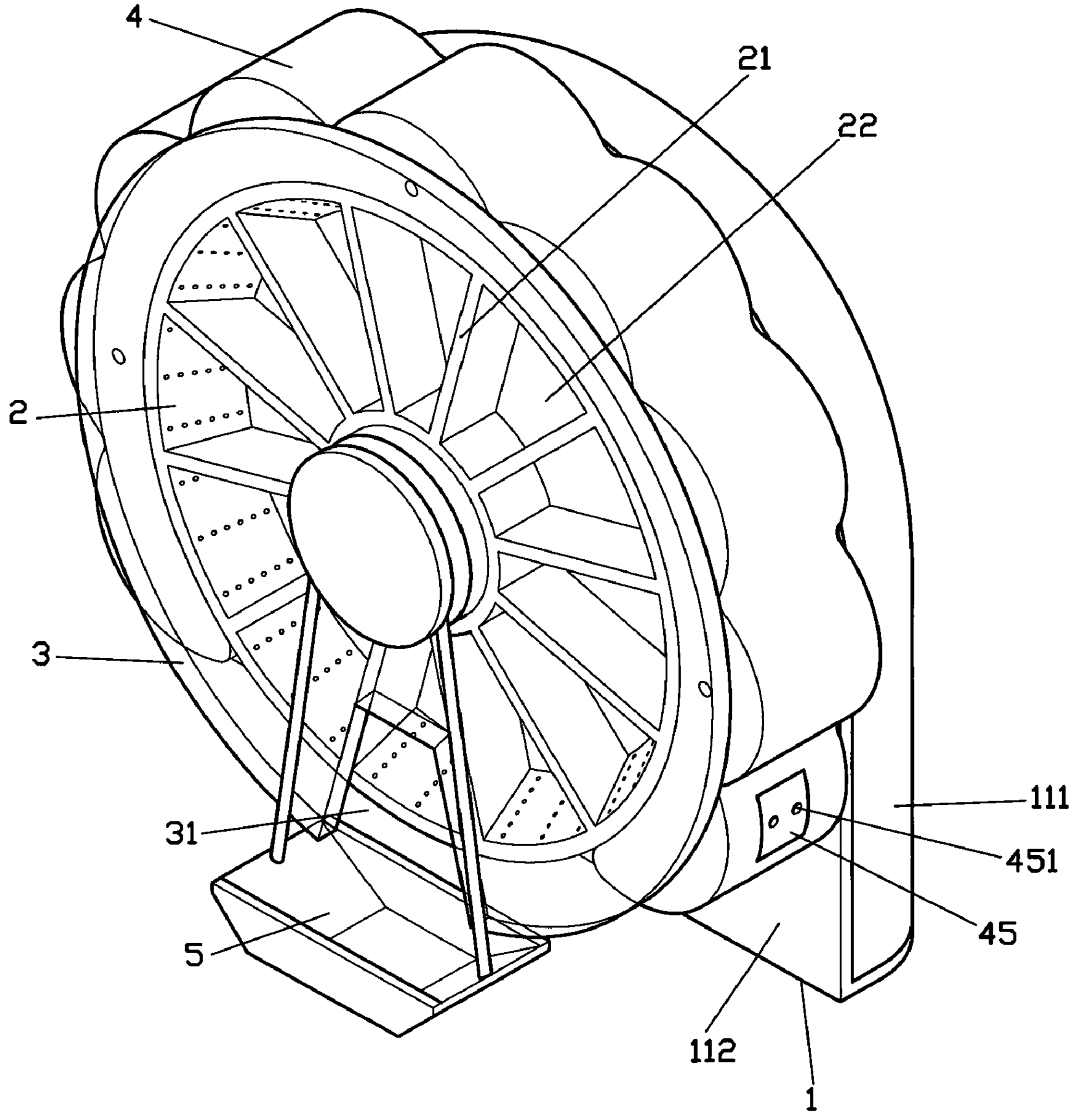
FIG. 2 is a perspective view of the preferred embodiment of the present invention.

Referring to FIGS. 1 and 2, the preferred embodiment for the method of the present invention comprises a control unit 1, a box 2, a front plate 3, a dehumidifying unit 4, and a collection tray 5.

Figure 5:
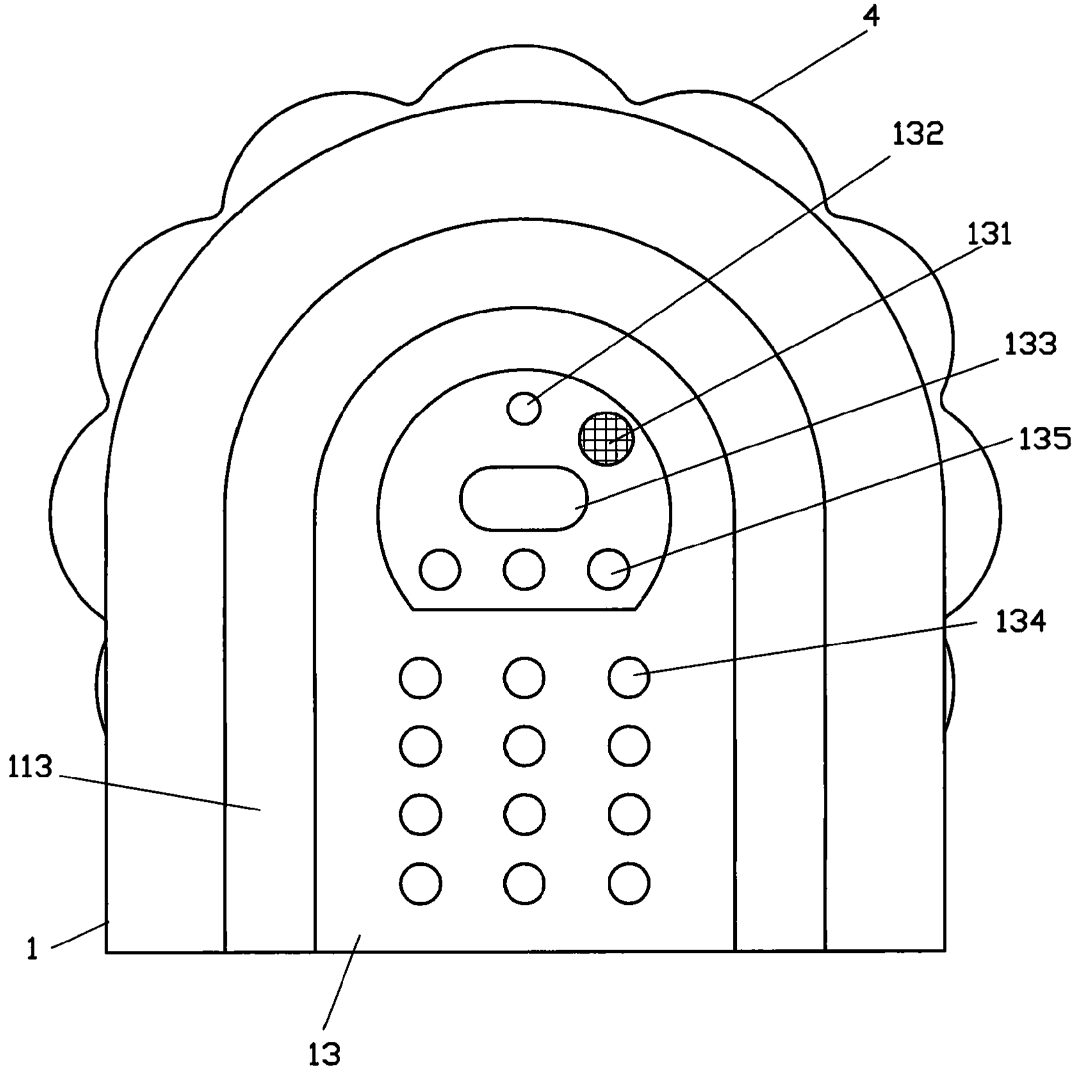
FIG. 5 is a rear view of the preferred embodiment of the present invention.
Figure 6:
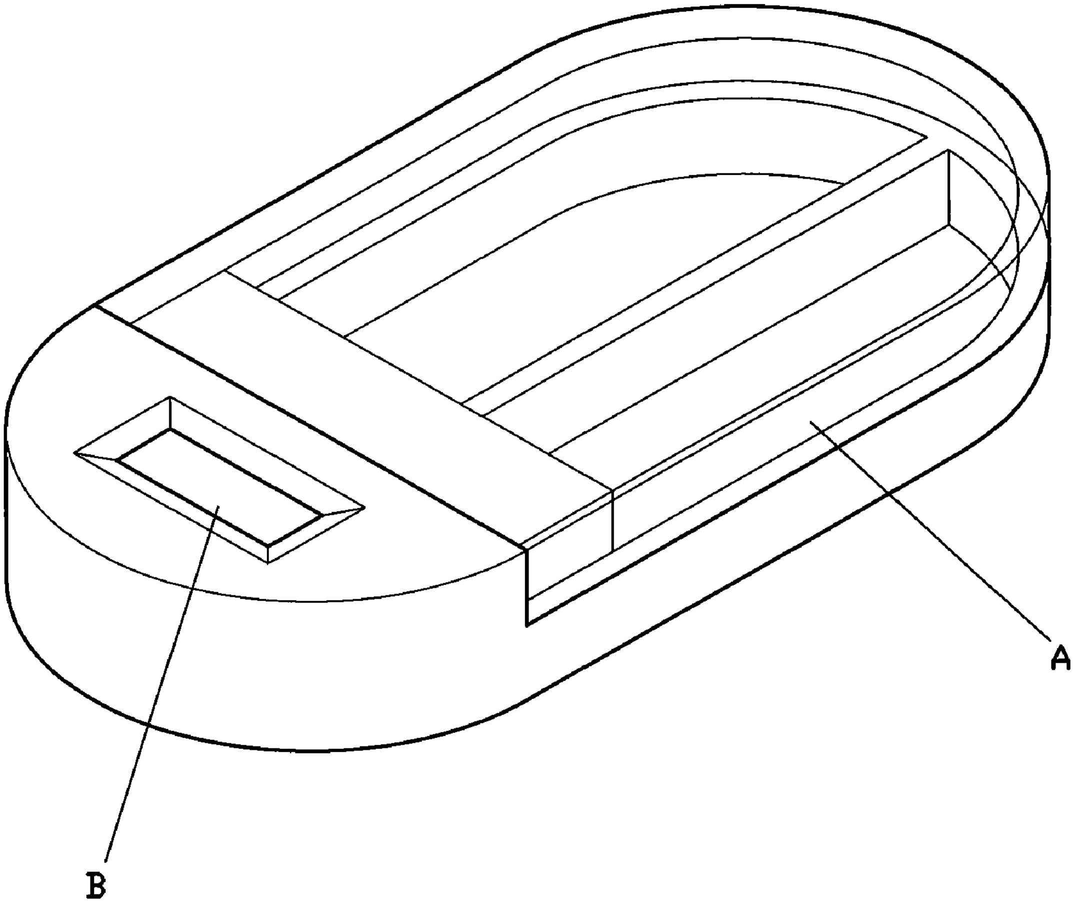
FIG. 6 (PRIOR ART)
FIG. 6 is a perspective view of a conventional pill box.

The control unit 1 includes a case 11 which has a cover 111 mounted on a top thereof, a transmission unit 12 that includes a motor 121 and an output shaft 122, and a display board 13 as shown in FIG. 5. The box 11 includes a first board 112 and a second board 113. The transmission unit 12 is located between the first and second boards 112, 113. The display board 13 is located outside of the second board 113. The display board 13 includes an alarm 131, a pill taking light 132, an LED clock 133, multiple adjustment buttons 134 and time setting buttons 135.

The box 2 has a central portion connected with the output shaft 122 of the transmission unit 2 and multiple separation plates 21 to define multiple rooms 22 in the box 2. The separation plates 21 are spaced at an equal distance and extend radially so that each room 22 has a narrow inner end and a wider outer end. A peripheral wall 23 of the box 2 has first holes 231 arranged linearly which are located corresponding to the rooms 22.

The front plate 3 includes an outlet 31 which is located corresponding to one of the rooms 22 of the box 2. The maximum width of the outlet 31 is less than the maximum width of each of the rooms 22.

Figure 3:
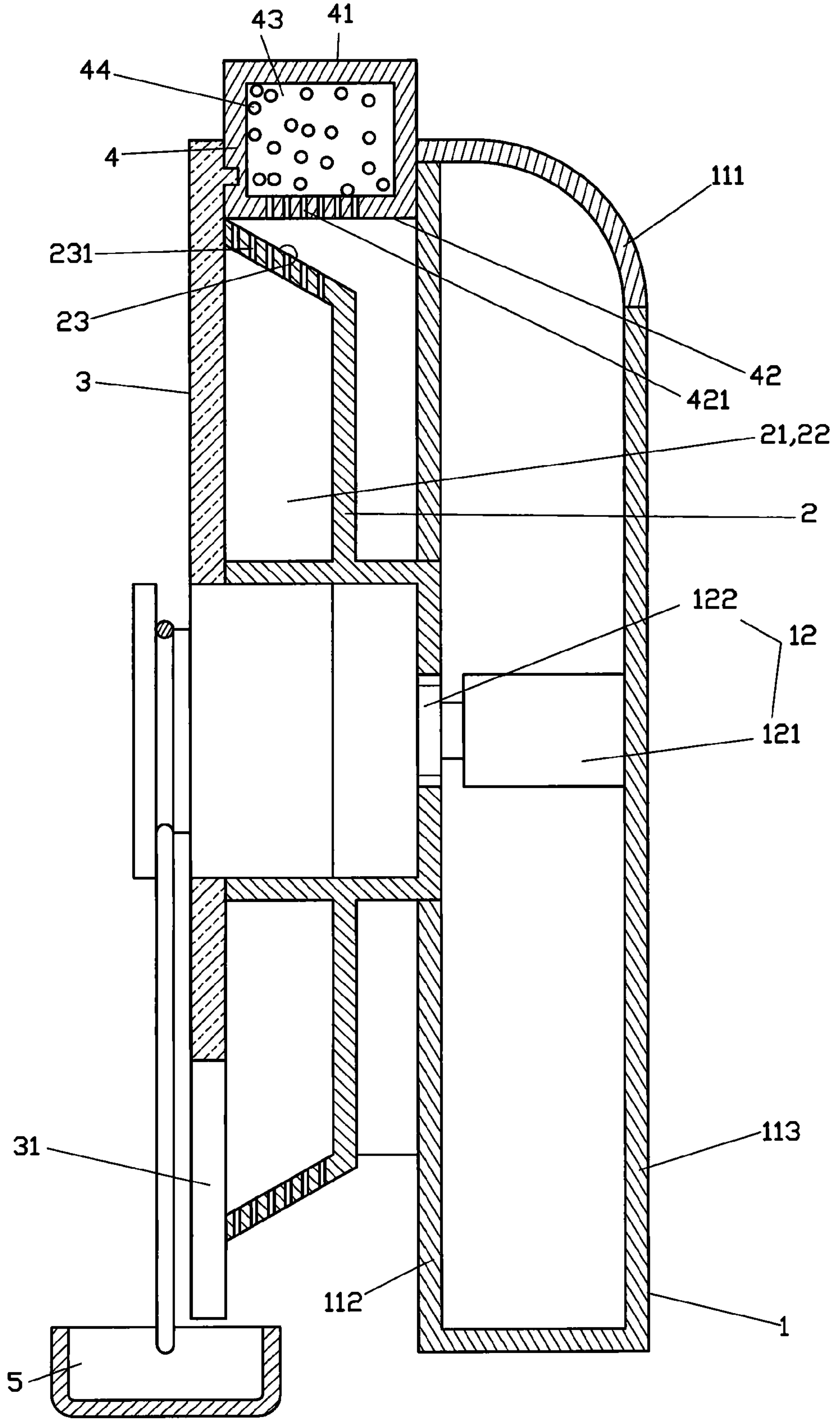
FIG. 3 is a side cross-sectional view of the preferred embodiment of the present invention.

The dehumidifying unit 4 is a C-shaped ring mounted on the box 2 so as to control the humidity in each the room 22 such that the humidity of each room 22 is lower than ambient humidity. The dehumidifying unit 4 has an outer wall 41, an inner wall 42, a space 43 defined between the outer wall 41 and the inner wall 42, and dehumidifying agent 44 disposed in the space 43, as shown in FIGS. 2 and 3. The dehumidifying agent 44 is made of $SiO_2$. The inner wall 42 has second holes 421 which are located corresponding to the rooms 22.

The collection tray 5 is connected to the case 11 and located corresponding to the outlet 31 of the front plate 3 so as to collect pills 6 dispensed from the outlet 31.

Figure 4:
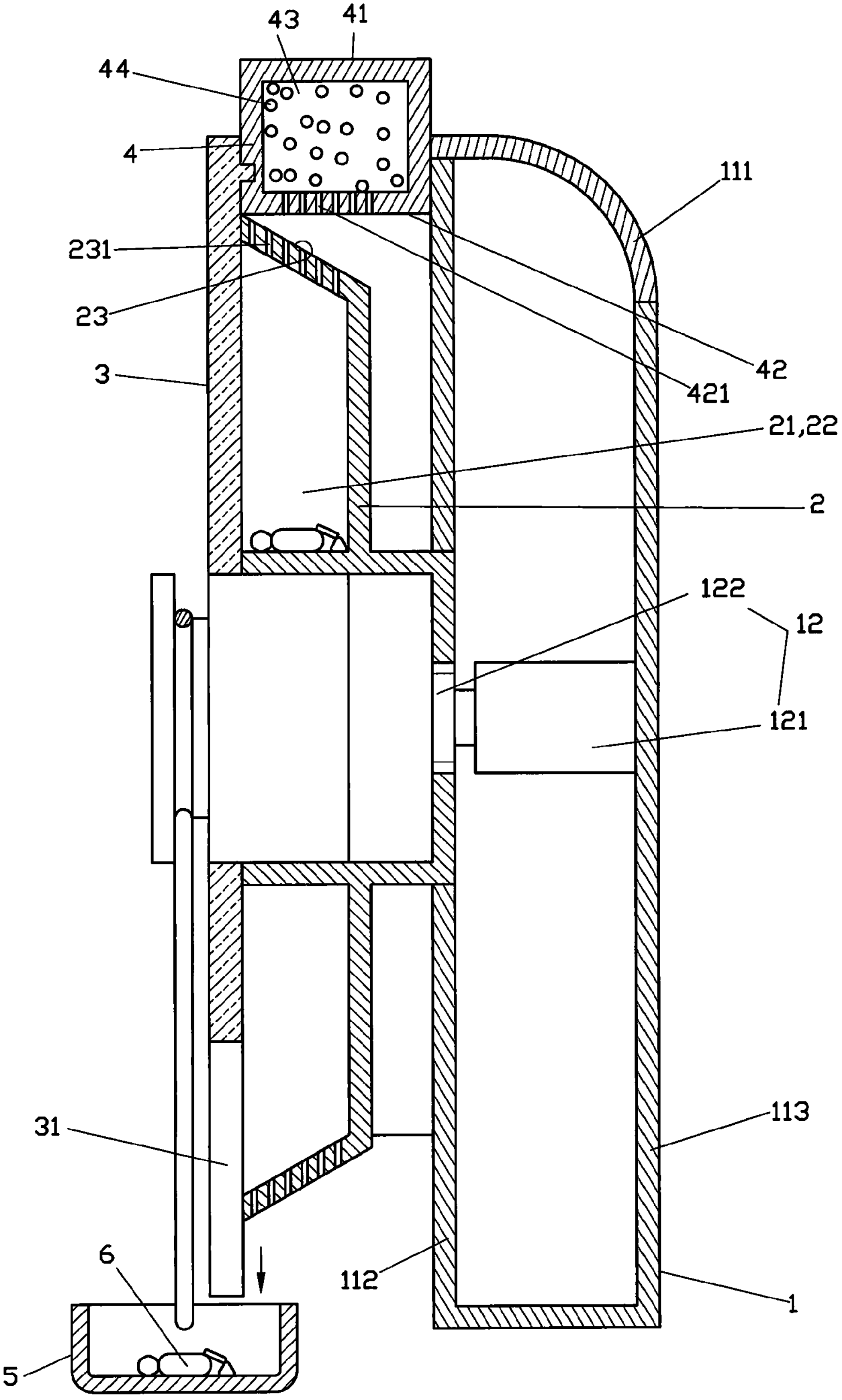
FIG. 4 is a side cross-sectional view to show that pills are dispensed from the outlet and collected in the collection tray.

Referring to FIGS. 3 and 4, the second holes 421 of the inner wall 42 of the dehumidifying unit 4 and the first holes 231 of the peripheral wall 23 of the box 2 make the air communicate between the dehumidifying unit 4 and the box 2, so that air can ventilate to reduce the humidity in the rooms 22 by the dehumidifying agent 44 to keep the pills 6 from being contaminated or changed their nature. Besides, the dehumidifying unit 4 further comprises an initialization unit 45. The initialization unit 45 includes reception holes 451 to be connected with a plug 452 to power the initialization unit 45 and to initialize the dehumidifying agent 44. The dehumidifying agent 44 is made of $SiO_2$ which absorbs humidity in the air and is functioned better than liquid dehumidifying agent. The dehumidifying agent 44 is non-toxic, odorless, non-vaporized and can be reused. When the dehumidifying agent 44 absorbs water to its saturated level, it can be tested by using test strips which will turn from blue to red. When the plug 452 is connected to the reception holes 451, the dehumidifying agent 44 is initialized within minutes.

As shown in FIGS. 4 and 5, when the time to take the pills 6 is set by operating the adjustment buttons 134 on the display board 13, the transmission unit 12 receives a signal at the pre-set time and the output shaft 122 drives the box 2 and the pills 6 in one room 22 are shifted to the outlet 31 and the pills 6 in the room 22 are dispensed to the collection tray 5 via the outlet 31. The alarm 131 and the pill taking light 132 are activated to remind the user to take the pills 6 by way of audio and/or light. The alarm 131 and the pill taking light 132 are cut off when the pills 6 are taken from the collection tray 5.

While we have shown and described the embodiment in accordance with the present invention, it should be clear to those skilled in the art that further embodiments may be made without departing from the scope of the present invention.

What is claimed is:

1. A method for control of humidity and auto-dispensing of pills in a pill box, comprising:

providing a box having multiple rooms defined therein which are shifted to be in alignment with an outlet to dispense pills from one of the rooms to the outlet;

controlling humidity in each of the rooms such that the humidity of each of the rooms is lower than ambient humidity by providing a dehumidifying agent in a space between an inner wall and an outer wall of a C-shaped ring;

providing a control unit which transmits a time setting signal and controlling a transmission unit to proceed a mechanical action to shift one of the rooms to be in alignment with the outlet according to the time setting signal and the pills being dispensed;

providing a display unit to display time information, reminding message to take pills, and the humidity of the rooms, and when any one of the rooms is in alignment with the outlet, the display unit displaying information to take the pills and providing a reminder by way of audio and/or light.

2. The method as claimed in claim 1, further comprising a dehumidifying agent to control the humidity in each of the rooms, the dehumidifying agent being SiO2 which is functioned in each of the rooms.

3. The method as claimed in claim 1, wherein the information to take the pills includes names of the pills, the amount that the pills to be taken, the way that the pills to be taken, the shapes of the pills and the colors of the pills.

4. The method as claimed in claim 1, wherein the audio and/or light are generated by light emitting diodes and sound generation elements.

5. The method as claimed in claim 1, wherein each room has at least one hole in a peripheral wall which are adjacent holes in the inner wall of the C-shaped ring so that air communicates between the space in the C-shaped ring and the rooms of the box.

* * * * *